No. 657,524. Patented Sept. 11, 1900.
P. DIEHL.
CLUTCH.
(Application filed Apr. 3, 1900.)
(No Model.)

WITNESSES:
H. J. Miller
C. M. Sweeney

INVENTOR:
Philip Diehl
BY
Henry Calver,
ATTORNEY.

THE NORRIS PETERS CO., PHOTO-LITHO., WASHINGTON, D. C.

UNITED STATES PATENT OFFICE.

PHILIP DIEHL, OF ELIZABETH, NEW JERSEY, ASSIGNOR TO THE SINGER MANUFACTURING COMPANY, OF NEW JERSEY.

CLUTCH.

SPECIFICATION forming part of Letters Patent No. 657,524, dated September 11, 1900.

Application filed April 3, 1900. Serial No. 11,371. (No model.)

*To all whom it may concern:*

Be it known that I, PHILIP DIEHL, a citizen of the United States, residing at Elizabeth, in the county of Union and State of New Jersey, have invented certain new and useful Improvements in Clutches, of which the following is a specification, reference being had therein to the accompanying drawings.

This invention relates to that class of clutches adapted to transmit motion from a rotary reciprocating driving member to a continuously or intermittingly rotating driven member; and it has for its object to provide a clutch of the class referred to which is adapted to withstand the wear incidental to rapidly-rotating parts, which will have a strong frictional hold on the driven member when transmitting power, and which will readily relax its grip when the movement of the driving member is reversed.

Figure 1:
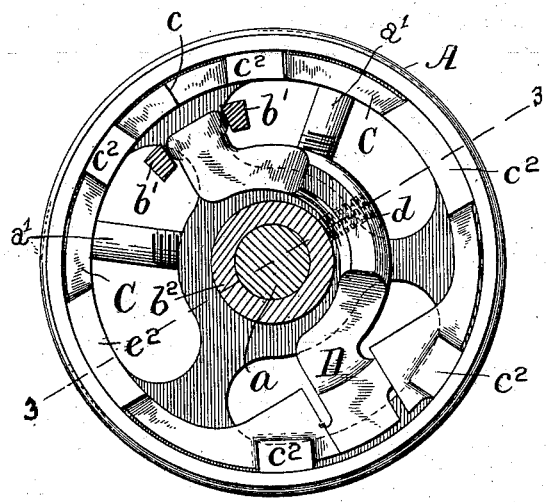
Figure 2:
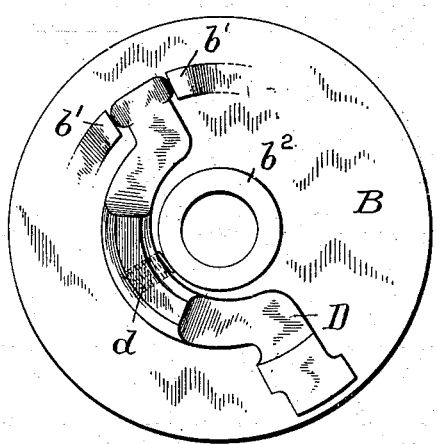
Figure 3:
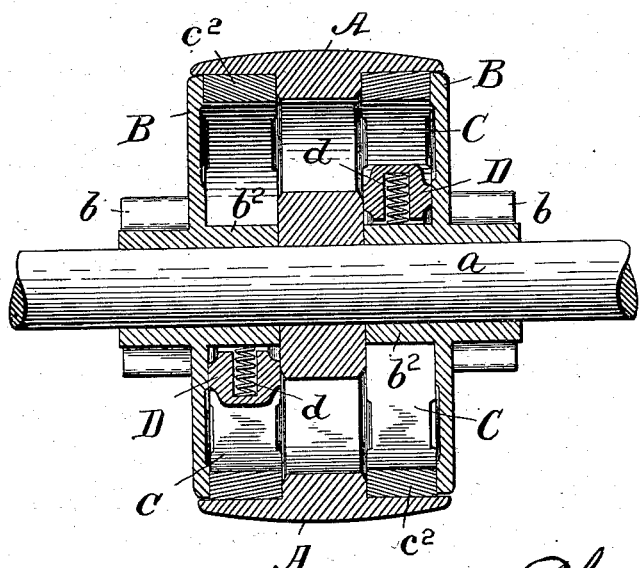

In the accompanying drawings, Figure 1 is a face view of the clutch and driven member, with portions of the driving member in section. Fig. 2 is an inside face view of the driving member, with the clutch-lever in operative relation thereto. Fig. 3 is a sectional view on line 3 3, Fig. 1, showing the clutch duplicated, and thus adapted for transmitting motion from two alternately-acting rotary reciprocating driving members to a single continuously-rotating driven member.

Referring to the drawings, A denotes a hub, pulley, or wheel to be driven and which is herein shown as being rigidly attached to a spindle or shaft $a$ by set-screws $a'$, but which might, if desired, be formed integral with said spindle or shaft.

B denotes the driving members, mounted to rotate loosely on the shaft or spindle $a$, said driving members each having a fixed pinion $b$, preferably formed integral therewith.

The faces of the driven member or wheel A are recessed for the reception of clutch-rings C, preferably (but not necessarily) cut through in the middle at $c$, thus forming two clutch-shoes separated at one point for the interposition between them of one end of the clutch-levers D, pivotally or loosely mounted at their opposite ends between lugs $b'$, formed on the inner faces of the disks or driving members B. The clutch-levers D have curved central portions, so as to extend around the shaft or spindle $a$, and also around bosses or hubs $b^2$ on the inner faces of the driving-disks B, the said hubs serving as central bearings or stops for the clutch-levers to limit their inward movements when the driving members are reversed and the clutch rings or shoes are released from their grip on the driven member or wheel.

To insure quick and unfailing action of the clutch shoes or rings in gripping the driven member or wheel when the driving members commence to rotate in a forward direction, as also quick releasing action, light coil-springs $d$ are preferably interposed between the clutch-levers D and the bosses or hubs $b^2$, forming the central bearing-points for the said clutch-levers; but these springs are not absolutely necessary, as the clutches will operate without them.

The clutch-shoes or divided clutch-rings C are preferably formed with a plurality of bearing points or sections $c^2$ for engagement with the inner faces of the flanges of the driven member or wheel A, although they might be formed with smooth outer surfaces for contact with the bearing-faces of the said driven member.

For convenience the above description of the invention refers to the preferred or duplicated form thereof shown in Fig. 3 of the drawings and adapted for operation in a treadle mechanism such as is shown by my United States Patent No. 630,194, dated August 1, 1899, and in which the driven member is a hub fixed to the shaft which is to be continuously rotated by alternately-acting rotary reciprocating driving members. It will, however, be understood that for imparting an intermittent rotary movement to a driven member—as, for example, a sewing-machine feeding-wheel—only a single clutch mechanism, such as is shown in Figs. 1 and 2, will be employed, and that the invention comprises either a single or a duplicated form of the improved clutch mechanism.

In the operation of the invention when a driving member is moved in a direction to have a tendency, by the drag on the driven member, to move the clutch-lever carried by said driving member inward toward the hub $b^2$ of said driving member or against the stress of a spring $d$ the grip of the clutch-shoes or divided clutch-ring on the driven member will be immediately relaxed to permit the driving member to rotate or move backward freely; but when the driving member is rotated forward the clutch-lever swings outward slightly from the stop or hub $b^2$ and a slight twisting prying movement of its end which is between the clutch-shoes or divided clutch-ring spreads or forces said shoes or split ring outward into a gripping contact with the inner face of the flange or the driven wheel or member, so that the continued movement of the said driving member is now imparted to said driven member.

The clutch-ring is preferably divided at the point $c$, for the reason that there will thus be less resistance to overcome at the commencement of the clutch-gripping action than there would be if said ring were only divided for the reception between its parts of the end of the clutch-lever.

Having thus described my invention, I claim and desire to secure by Letters Patent—

1. In a clutch mechanism, the combination with a member or wheel to be driven, of a split clutch-ring housed within said member or wheel, a clutch-lever having one end interposed between the parts of said split clutch-ring, a central bearing or stop for said clutch, and a driving member or part operatively connected with the other end of said clutch-lever.

2. The combination with a pulley or wheel to be driven and a shaft or spindle rigid therewith, of a driving member or disk loosely mounted on said shaft or spindle and having on its inner face a boss or hub, a clutch-lever operatively connected at one end with said driving member or disk, a central bearing or stop for said clutch-lever at said boss or hub, and a split clutch-ring housed within said driven pulley or wheel and between the parts of which the other end of said clutch-lever is interposed.

3. The combination with the wheel or pulley A having recessed opposite faces, of the shaft or spindle $a$ rigid with said wheel or pulley, the driving-disks or driving members B loosely mounted on said shaft or spindle and provided with the pinions $b$ on their outer faces and the hubs or bosses $b^2$ on their inner faces, the split clutch-rings C housed in the recessed faces of said wheel or pulley, and the clutch-levers D each operatively connected at one end with said disks or driving members and each having its other end interposed between parts of said split clutch-rings, said levers having central bearings at said hubs or bosses, to operate substantially as hereinbefore set forth.

In testimony whereof I affix my signature in the presence of two witnesses.

PHILIP DIEHL.

Witnesses:
HENRY CALVER,
HENRY J. MILLER.